(12) United States Patent
Simpson et al.

(10) Patent No.: US 11,942,853 B2
(45) Date of Patent: Mar. 26, 2024

(54) ELECTRIC MOTOR CONTACT ADAPTER

(71) Applicant: Brose Fahrzeugteile SE & Co. Kommanditgesellschaft, Würzburg, Würzburg (DE)

(72) Inventors: Stanley Simpson, Oxford, MI (US); Joseph Suriano, Grand Blanc, MI (US)

(73) Assignee: Brose Fahrzeugteile SE & Co. Kommanditgesellschaft, Würzburg (DE)

( * ) Notice: Subject to any disclaimer, the term of this patent is extended or adjusted under 35 U.S.C. 154(b) by 512 days.

(21) Appl. No.: 17/060,727

(22) Filed: Oct. 1, 2020

(65) Prior Publication Data
US 2022/0109346 A1    Apr. 7, 2022

(51) Int. Cl.
*H02K 5/15* (2006.01)
*H01R 13/04* (2006.01)
*H02K 3/50* (2006.01)
*H02K 5/22* (2006.01)
*H02K 11/01* (2016.01)
*H02K 15/00* (2006.01)
*H02K 15/14* (2006.01)

(52) U.S. Cl.
CPC ............ *H02K 5/225* (2013.01); *H01R 13/04* (2013.01); *H02K 3/50* (2013.01); *H02K 5/15* (2013.01); *H02K 11/0141* (2020.08); *H02K 15/0062* (2013.01); *H02K 15/14* (2013.01); *H01R 2201/10* (2013.01); *H02K 2203/09* (2013.01)

(58) Field of Classification Search
CPC   H02K 5/225; H02K 5/22; H02K 5/15; H02K 11/30; H02K 5/10; H02K 9/00; H02K 11/33
See application file for complete search history.

(56) References Cited

U.S. PATENT DOCUMENTS

| 2020/0195079 | A1* | 6/2020 | Devermann | H02K 5/10 |
| 2020/0313503 | A1* | 10/2020 | Hattori | H02K 11/30 |
| 2021/0305853 | A1* | 9/2021 | Takahashi | H02K 3/28 |
| 2022/0069677 | A1* | 3/2022 | Palmer | H02K 5/225 |
| 2022/0231568 | A1* | 7/2022 | Obendorfer | H02K 3/522 |

* cited by examiner

*Primary Examiner* — Leda T Pham
(74) *Attorney, Agent, or Firm* — Dickinson Wright PLLC

(57) ABSTRACT

An electric motor including a housing, a busbar, an end plate, and a contact adapter. The housing may include a shield that may define an aperture. The busbar may extend from a stator towards the aperture and the busbar may be disposed within the housing. The contact adapter may include a base member, a contact member, and a protrusion. The contact member may extend from the base member and contact the busbar. The protrusion may extend from the base member and the protrusion may be sandwiched between the shield and the end plate.

15 Claims, 6 Drawing Sheets

US 11,942,853 B2

ELECTRIC MOTOR CONTACT ADAPTER

TECHNICAL FIELD

The present disclosure relates to an electric motor such as an electric motor for use in motor vehicles.

BACKGROUND

Vehicles may include a number of electric motors, such as a motor to actuate a window, a vehicle brake, or a steering mechanism. The motors may include a stator, a rotor and a motor shaft that mounts to the stator or the rotor. Power may be supplied to the motor via a connection plug that may be electrically connected to windings of the stator.

SUMMARY

According to one embodiment, an electric motor is provided. The electric motor may include a housing, a busbar, an end plate, and a contact adapter. The housing may include a shield that may define an aperture. The busbar may extend from a stator towards the aperture and the busbar may be disposed within the housing. The contact adapter may include a base member, a contact member, and a protrusion. The contact member may extend from the base member and contact the busbar. The protrusion may extend from the base member and the protrusion may be sandwiched between the shield and the end plate.

According to another embodiment, a contact adapter for use in an electric motor is provided. The contact adapter may include a body, a contact member, and a first foot. The body may include a bottom portion, a top portion, and a first sidewall extending in a vertical direction. The contact member may include a first end and a second end. The first end may extend in a vertical direction from the body and the second end may extend in a horizontal direction, that may be substantially orthogonal to the vertical direction, from the body. The first foot may extend from the bottom portion of the body.

The contact adapter may include a second foot. The first foot may extend from a first distal end of the first sidewall and the second foot may each extend from a second distal end of the first sidewall. The first foot and the second foot may each include a number of deformable ribs.

According to yet another embodiment, a method of assembling an electric motor is provided. The electric motor may include a base member, a contact member, and a foot. The contact member and the foot may each extend from the base member. The method may include, inserting the at least a portion of the contact member into a receptacle defined by an end portion of the electric motor; attaching a the contact member to a busbar disposed within the housing; and placing an end plate to sandwich the foot of the contact adapter between the end plate and the portion of the electric motor.

DETAILED DESCRIPTION

Figure 1:
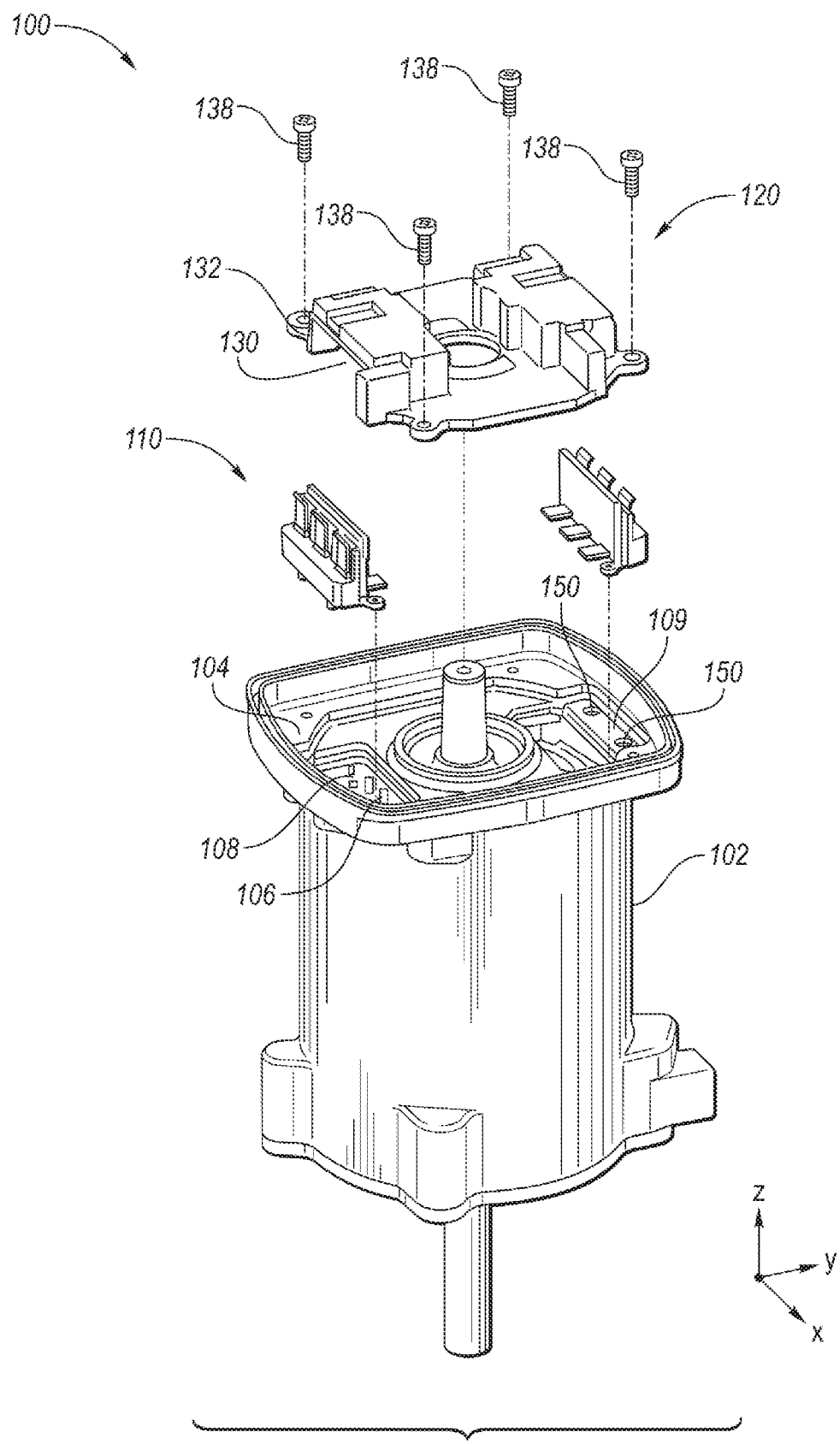
FIG. 1 illustrates an exploded perspective view of an exemplary electric motor.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As used in the specification and the appended claims, the singular form "a," "an," and "the" comprise plural referents unless the context clearly indicates otherwise. For example, reference to a component in the singular is intended to comprise a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The term "deform" or "deformable" may be used herein to describe disclosed or claimed embodiments. The term "deform" or "deformable" may refer to a permanent distortion, such as plastic deformation that occurs when a material is subjected to tensile, compressive, bending, or torsion stresses that exceed its yield strength and cause it to elongate, compress, buckle, bend, or twist. The term "deform" or "deformable" may also refer to a temporary shape change that is self-reversing after the force is removed, so that the object returns to its original shape.

Electric motors, such as brushless electric motors are generally connected to a printed circuit board adapter (PCBA) by a wire harness to a contact adapter fixed to the motor. Contact adapters include electrical connections extending between a component of the electric motor, such as a stator or a rotor, to the contact adapter. One of the challenges associated with known contact adapters is protecting or shielding the electrical connections prior to assembling the wire harness or other connecting device to the contact adapter. Failing to protect the contact adapter may result in damage to the electrical contacts during assembly or in transit. Known contact adapters may require a cover that may create additional costs. Or other known contact adapters may not provide any protection at all.

Referring generally to the figures, an electric motor 100 is provided. The electric motor 100 may include a housing 102 that may be provided with a shield 104. The electric motor 100 may include a stator (not illustrated) that may be disposed within the housing 102. One or more busbars 106 may extend from the stator towards an aperture 108 defined by the shield 104. The electric motor 100 may include one or more contact adapters 110. The contact adapter 110 may include a body or a base member 112 and a contact member 114 that may extend from the base member 112. At least a portion of the contact member 114 may be fixed to the busbar 106 by welding such as resistance welding, laser welding or another suitable process. The motor 100 may include an end plate 120 that may be arranged to sandwich portions of the contact adapter 110 to the shield 104.

The base member 112 may include a bottom portion 122, a top portion 124, and a first sidewall 126 extending therebetween. As an example, the first sidewall 126 may extend in a vertical direction. The contact adapter may include one or more feet 116 including a first foot 116a and a second foot 116b that may each extend from a bottom portion 122 of the base member 112. One or more of the feet 116 may include a number of deformable ribs 118 that may be configured to engage an end plate 120 that may sandwich at least one of the feet 116 against the shield 104. The deformable ribs 118 may be configured to deform as the end plate 120 is attached to or fixed to the shield 104. As an example, the shield 104 may define a recessed portion such as a receptacle 109 that may receive a portion of the base member 112.

In one or more embodiments, the base member may include a first distal end 127 and a second distal end 128. The first foot 116a may extend from the first distal end 127 and the second foot 116b may extend from the second distal end 128. The end plate 120 may define a receptacle 130 that may be formed by a recessed portion of the end plate 120. An inner periphery of the receptacle 130 may be formed by a number of walls 132, 134, 136 that may at least partially surround portions of the base member 112. The walls 132, 134, 136 may lie against or be positioned adjacent to the contact adapter so that the contact adapter is restrained from moving in the x-direction and y-direction.

In one or more embodiments, the shield 104 may be a bearing shield that houses one or more bearings (not illustrated) or a magnetic shield configured to absorb electromagnetic waves generated by the stator or other electrically charged components disposed within the housing 102. As an example, the end plate 120 may be a heat sink configured to transfer heat from electronics disposed within the motor housing 102 or between the shield 104 and the end plate 120.

FIG. 1 illustrates a perspective-exploded view of the electric motor 100. As mentioned above, the motor 100 includes a housing 102 and an end portion such as the shield 104. The shield 104 defines a number of apertures 108 and one or more busbars 106 may extend towards or into one or more of the apertures 108. The contact adapter 110 is positioned above the motor housing with respect to the z-axis.

A number of fasteners 138 and the end plate 120 are shown above the contact adapter 110. The fasteners 138 may fasten the end plate 120 to the shield 104 so that the contact adapter is fixed between the end plate 120 and the shield. The fasteners 138, the end plate 120, and the shield 104 may form a number of fastener joints. Each of the joints may be configured to receive a predetermined torque so that the end plate 120 is fixed to the shield 104. The predetermined torque may be based on a pressure applied by the end plate 120 to the deformable ribs 118 so that the deformable ribs deform as the end plate 120 is fastened to the shield 104.

As another example, the end plate 120 may be fixed to the shield 104 by other methods, such as welding, adhesive or a mechanical lock, e.g., tongue and groove, force fit, or snap in features.

Figure 2:
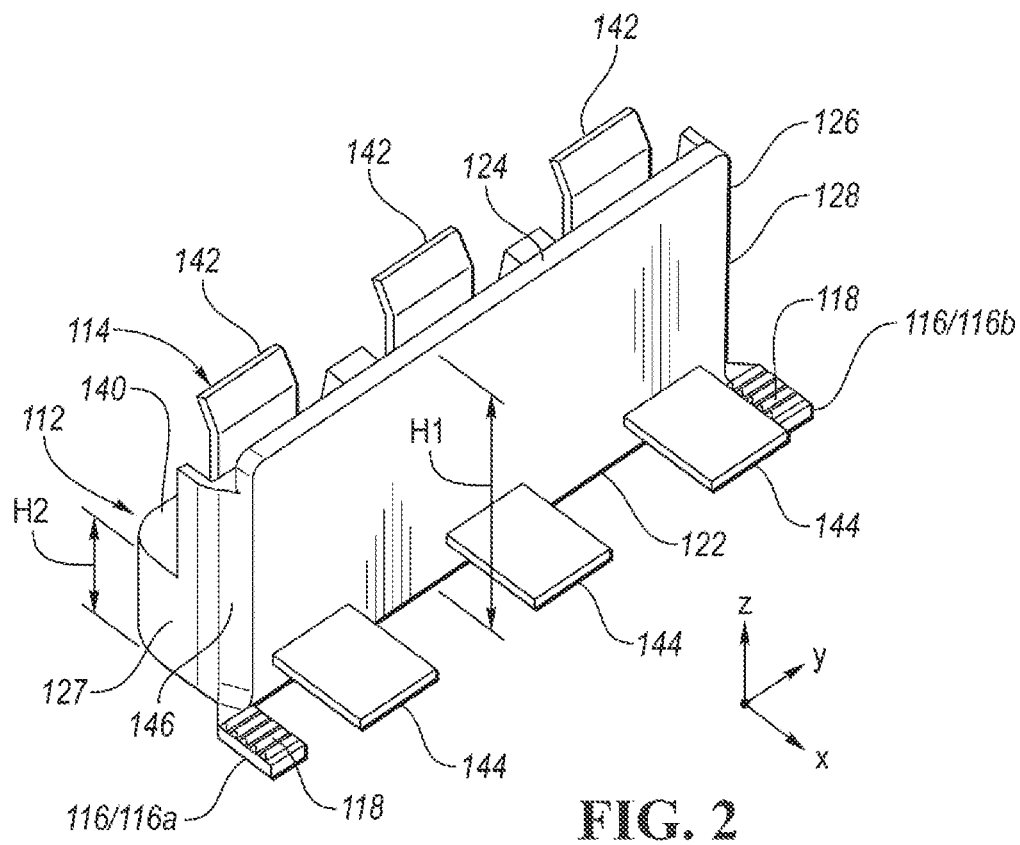
FIG. 2 illustrates a top-perspective view of an exemplary contact adapter.

FIG. 2 illustrates a perspective view of the contact adapter 110. The body or base member 112 may include a second sidewall 140 that may extend from the first sidewall 126. The first sidewall 126 may have a first height H1 and the second sidewall 140 may have a second height H2 that may be less than the first height H1. The contact member 114 may include a first portion 142 and a second portion 144. The first portion 142 may extend in a vertical direction or parallel to the z-direction from the second sidewall 140. The second portion 144 may extend in a horizontal direction or the x-direction. The first sidewall 126 and the second sidewall 140 may be integrally formed with one another. A curved portion or inner radius 146 may be formed between the second sidewall 140 and the first sidewall 126. The inner radius 146 may be configured to engage the walls 132, 134 of the end plate 120 (FIG. 1).

The second portion 144 may be fixed to the busbar 106 so that the second portion 144 is electrically connected to the busbar 106. The first portion 142 of the contact member 114 may be spaced apart from the first sidewall 126 so that a connector (not illustrated) may engage the first portion of the contact member 114.

In one or more embodiments, base member 112 may be injected molded and may be formed of a polymeric material, such as thermoplastic, thermoset plastics, or other polymers. As an example, the base member or body 112 may be formed of polybutylene terephthalate (PBT) that may include a predetermined amount of glass-filled fibers that may range between 15% and 45%. In one or more embodiments, portions of the base member 112 may be over molded over the contact member 114.

Figure 3:
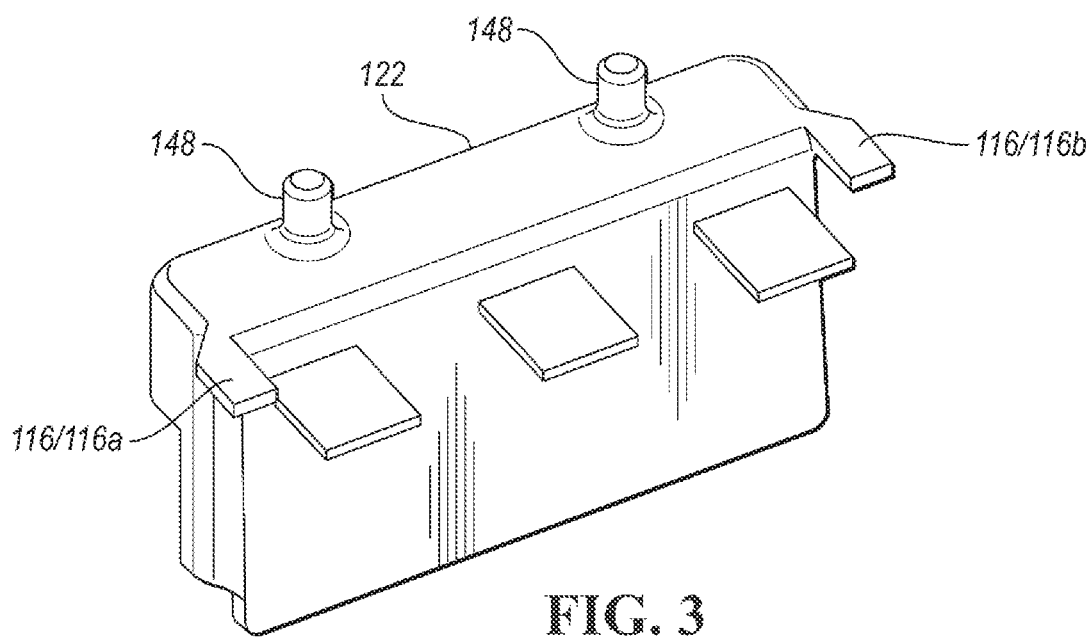
FIG. 3 illustrates a bottom-perspective view of an exemplary contact adapter.

FIG. 3 illustrates a bottom-perspective view of the contact adapter 110. The contact adapter 110 may include one or more locating protrusions 148 that may extend from the bottom portion 122 of the contact adapter 110. The locating protrusions 148 may be inserted into a number of locating receptacles 150 (FIG. 1) that may be defined by the shield 104. The locating receptacles 150 may be formed by an aperture or a recessed portion of the shield 104.

Figure 4:
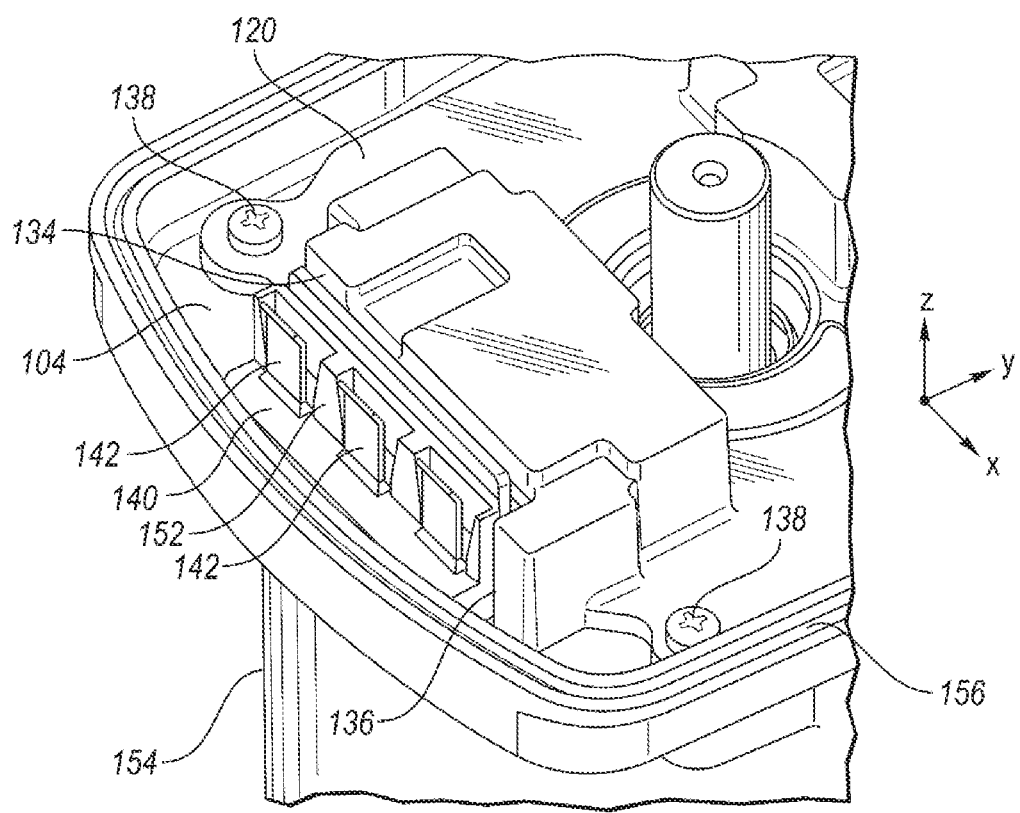
FIG. 4 illustrates a detailed-perspective view of a portion of the exemplary electric motor shown in FIG. 1.

FIG. 4 illustrates a top-perspective view of a portion of the electric motor 100. As illustrated, the end plate 120 is fixed to the shield 104 by the fasteners 138. As mentioned above, the contact adapter 110 is at least partially surrounded by the walls 132, 134, 136 of the end plate 120. The contact adapter 110 may include a protrusion 152 that may extend from the second sidewall 140 so that the protrusion 152 is disposed between first portions 142 of the contact member 114.

In one or more embodiments, the housing 102 may include a first housing wall 154 that may have a cylindrical shape and house the stator and the rotor (not illustrated). A second housing wall 156 may extend from the first housing wall 154 and define a shield receptacle. The shield receptacle may receive the shield 104.

Figure 5:
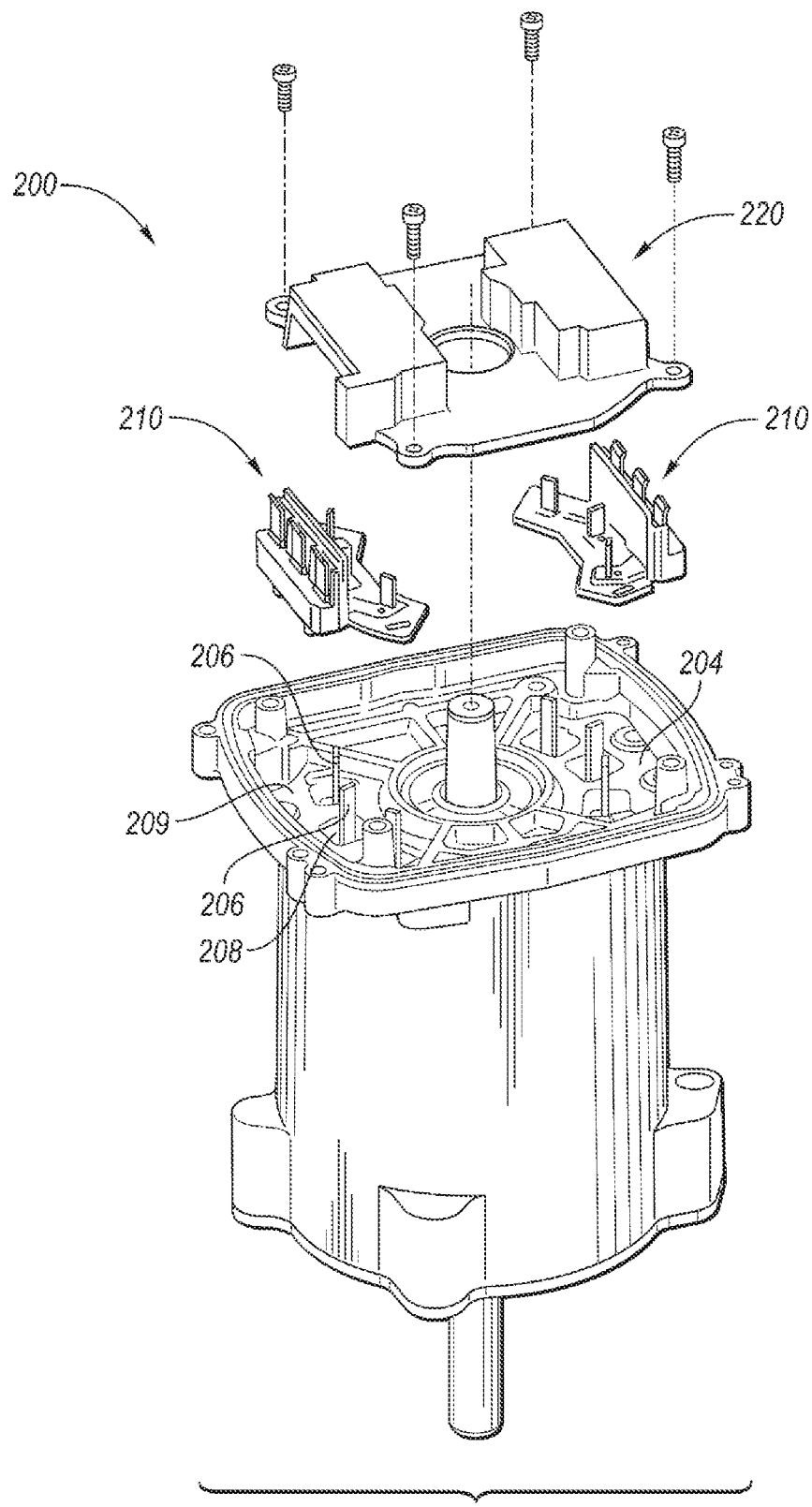
FIG. 5 illustrates an exploded perspective view of another exemplary electric motor.

FIG. 5 illustrates an exploded-perspective view of another exemplary motor 200. The motor 200 may include a shield 204 that may be disposed at an end of the motor 200. The shield 204 may define a recessed portion that may form a receptacle 209. The motor 200 may include a contact adapter 210 that may be inserted into the receptacle 209. The shield 204 may define one or more apertures 208 and one or more busbars 206 may extend towards or extend through one or more of the apertures 208. An end plate 220, shown above the contact adapters 210, may be attached to the shield 204 and sandwich portions of the contact adapter to the shield 104.

Figure 6:
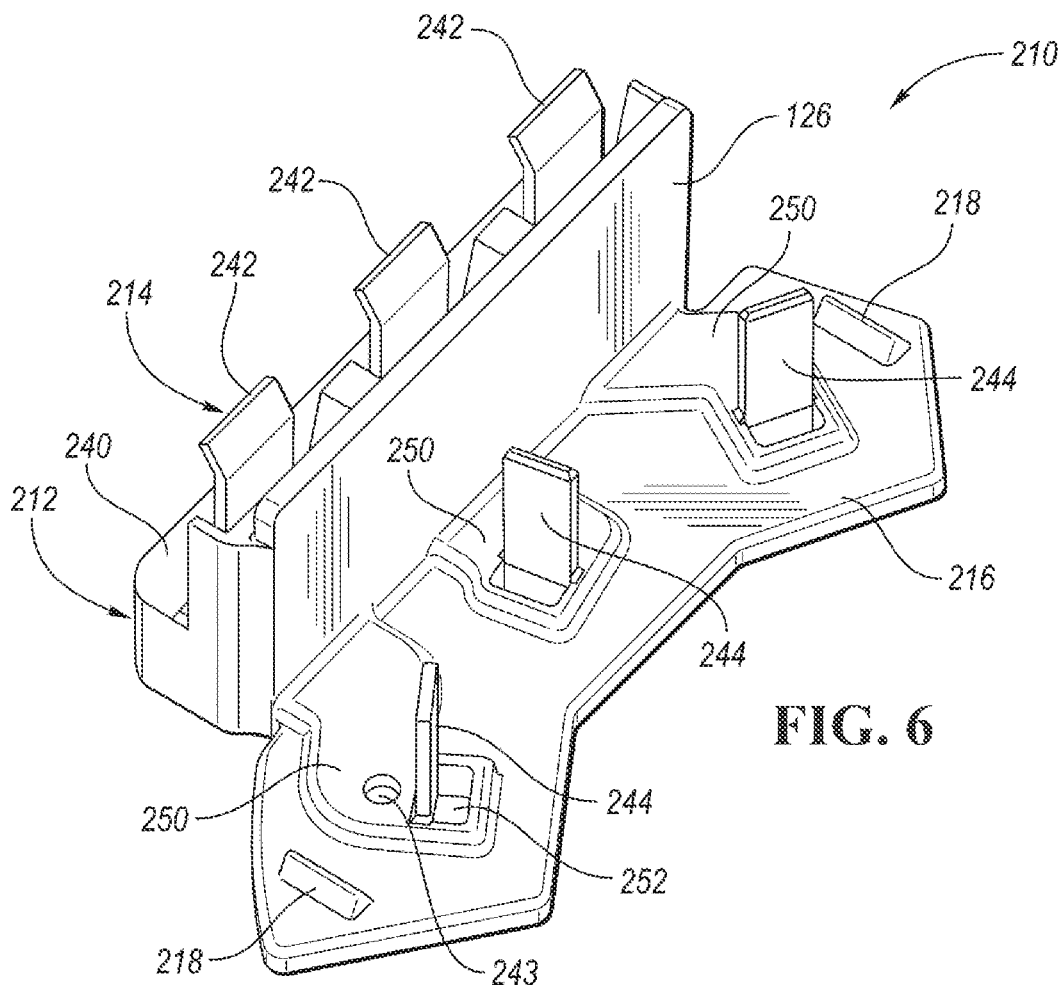
FIG. 6 illustrates a top-perspective view of another exemplary contact adapter.

FIG. 6 illustrates a top-perspective view of the contact adapter 210. The contact adapter 210 may include a protrusion 216 that may extend from the first sidewall 126 of the base member 212. A contact member 214 may be disposed within and extend from the base member 212. The contact member 214 may include a first end 242, that may extend in a vertical direction from a second sidewall 240 of the base member 212, and a second end 244 that may extend in a vertical direction from the protrusion 216. The contact member 214 may include a medial portion 243 that extends between the first end 242 and the second end 244. Portions of the medial portion 243 may be enclosed or embedded within the protrusion 216. As an example, the protrusion 216 may include one or more raised sections 250 that may enclose or encapsulate the medial portion 243 of the contact member 214.

In one or more embodiments, one or more crush ribs 218 may extend from the protrusion 216. The crush ribs 218 may be disposed near an outer periphery of the protrusion 216 so that the end plate 220 engages and deforms the crush ribs 218 as the end plate is fixed to the shield 204. The protrusion 216 may define a busbar aperture 252 that may receive the second end 244 of the contact member and a portion of the busbar 206. Vertical walls of the busbar 206 and the second end 244 of the contact member 214 may be fixed to one another by resistance welding or another suitable fixation means.

Figure 7:
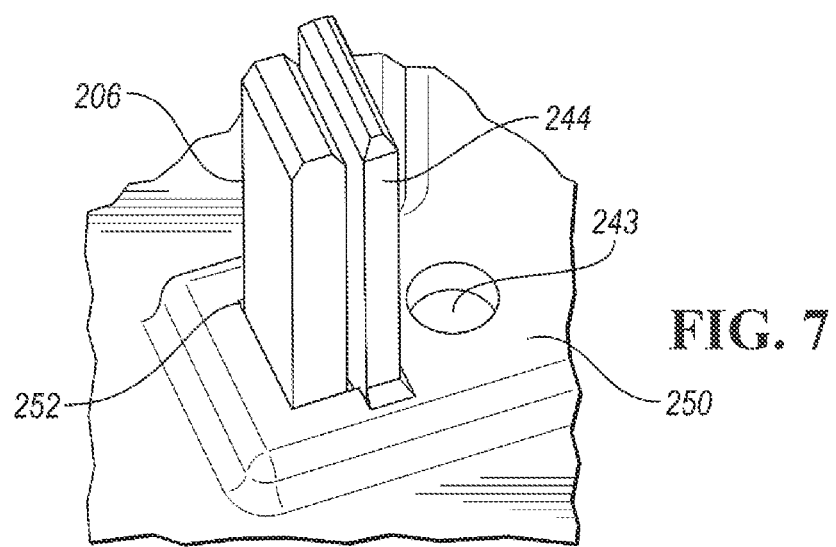
FIG. 7 illustrates a top-perspective view of a portion of the exemplary contact adapter shown in FIG. 6.

FIG. 7 illustrates a top-perspective view a portion of the contact adapter 210 assembled to the busbar 206. In one or more embodiments, the busbar aperture 252 may be used to locate the contact member 210 with respect to the busbar 206 and the shield 204. This locating feature may be employed in addition to the locating protrusions 148.

Figure 8:
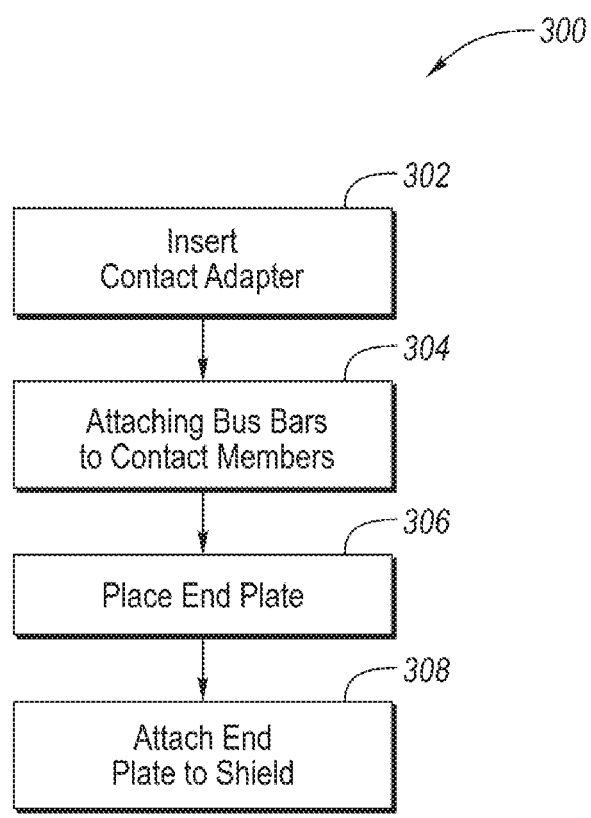
FIG. 8 illustrates an exemplary process to assemble the exemplary electric motor.

FIG. 8 illustrates a flowchart 300 describing an exemplary assembly process for the electric motor 100. The components described below are those components illustrated in FIG. 1 through FIG. 4. However, the method described below and depicted in the flowchart 300 also apply to the components provided in FIG. 5 through FIG. 7. The process may include step 302 providing or inserting the contact adapter 110. Inserting the contact adapter 110 may include inserting the locating protrusions 148 into the locating receptacles 150. As another example, the inserting step 302 may include inserting a portion of the body 112 into the receptacle 109. The contact adapter may be located or positioned by an assembly operator during a manual process or by a machine during an automated or semi-automated process.

After step 302, the contact members 114 may be attached to one or more of the busbars 106, in step 304. The contact members 114 may be attached to the busbars 106 by welding such as laser welding or resistance welding or another suitable means of fixation.

In step 306, the end plate 120 may be placed on the shield 104 so that one or more portions of the end plate 120 engage the feet 116, 216 of the contact adapter 110, 210. As an example, step 306 may include centering or otherwise positioning the receptacle 130 relative to the contact adapter 110 so that the receptacle 130 at least partially surrounds the contact adapter 110.

In step 308, the end plate 120 may be attached to the shield 104. In one or more embodiments, the fasteners 138 may be fastened between the end plate 120 and the shield 104 to form a number of fastening joints. Each of the fastening joints may be secured by a predetermined torque that may be applied by a screw gun or other suitable device. A torque transducer may be coupled to the screw gun so that torque may be monitored. As torque is applied to the fastening joint, the end plate may move towards the shield so that a clamping load is applied from the end plate 120 to the foot 116 of the contact adapter 110. As the clamping load increases, the deformable ribs 118 may deform in response to a predetermined clamping load. In one or more embodiments, the end plate 120, the deformable ribs 118, or both may be configured to deform so that portions of the end plate engage or lie against the shield in response to a predetermined clamping load or pressure applied by the end plate 120 to shield or vice-versa.

In one or more embodiments, the end plate 120 may be pressed onto the foot 116 of the contact adapter 110 with a predetermined force to generate a predetermined pressure. After or as the predetermined pressure is applied, the end plate 120 may be fixed to the shield 104 by welding, an adhesive or another suitable fixation means.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

100 electric motor
102 housing
104 shield
106 busbar
108 aperture
109 recessed portion
110 contact adapter
112 body/base member
114 contact member
116, 116a, 116b foot
118 deformable ribs
120 end plate
122 bottom portion
124 top portion
126 first sidewall
127 first distal end
128 second distal end
130 receptacle
132 wall
134 wall
136 wall
138 fastener
140 second sidewall
142 first portion
144 second portion
146 inner radius
148 locating protrusions
150 locating receptacles
152 protrusion
154 first housing wall
156 second housing wall
200 motor
204 shield
206 busbar
208 aperture
209 receptacle
210 contact adapter
212 base member
216 foot/protrusion
218 deformable rib/crush rib
220 end plate
240 second sidewall
242 first end
243 medial portion
244 second end
250 raised sections
252 busbar aperture
300 flow chart
302 inserting step
304 step
306 step
308 step
116a first foot
116b second foot

What is claimed is:

1. An electric motor comprising:
a housing including a shield defining an aperture;
a busbar extending from a stator towards the aperture, the busbar disposed within the housing;
an end plate;
a fastener forming a fastening joint and connecting the end plate to the shield; and
a contact adapter including
a base member,
a contact member extending from the base member and contacting the busbar, and
a protrusion extending from the base member, the protrusion including a plurality of deformable ribs, wherein at least a portion of the protrusion is sandwiched between the shield and the end plate, and
wherein the fastening joint is securable by a predetermined fastening torque and the plurality of deformable ribs are configured to deform at predetermined pressure, wherein the predetermined pressure is at least partially based on the predetermined fastening torque.

2. The electric motor of claim 1, wherein a portion of the contact member is at least partially embedded in the protrusion.

3. The electric motor of claim 1, wherein the number of deformable ribs are configured to deform so that portions of the end plate contact portions of the shield.

4. The electric motor of claim 1, wherein the protrusion includes a distal portion extending beyond the base member.

5. The electric motor of claim 4, wherein a deformable rib of the number of deformable ribs extends from a top surface of the distal portion.

6. The electric motor of claim 1, wherein the end plate defines a recess and the contact adapter nests within the recess.

7. The electric motor of claim 1, wherein the contact adapter includes a number of locating pins extending from the base member and configured to be received by a number of locating apertures defined by the shield.

8. The electric motor of claim 1, wherein the protrusion is integrally molded to the base member.

9. A contact adapter for use in an electric motor comprising:
a body including a bottom portion, a top portion, and a first sidewall extending therebetween in a vertical direction;
a contact member including a first end and a second end, wherein the first end extends in the vertical direction from the body and the second end extends in a horizontal direction, substantially orthogonal to the vertical direction, from the body;
a first foot extending in the horizontal direction from the bottom portion of the body, so that the first foot is configured to be sandwiched between an end plate of the electric motor and a shield of the electric motor; and
a second foot, wherein the first foot extends from a first distal end of the first sidewall and the second foot extends from a second distal end of the first sidewall.

10. The contact adapter of claim 9, wherein the first foot and the second foot each include a number of deformable ribs.

11. The contact adapter of claim 10, wherein the first foot and the second foot are parallel to at least a portion of the second of the contact member.

12. A method of assembling an electric motor having a contact adapter including a base member, a contact member, and a protrusion, the contact member and the protrusion extending from the base member, the method comprising:
   inserting at least a portion of the contact adapter into a receptacle defined by shield of the electric motor;
   attaching the contact member to a busbar disposed within a housing of the electric motor;
   placing an end plate to sandwich the protrusion of the contact adapter between the end plate and the shield of the electric motor, wherein the protrusion includes a plurality of deformable ribs;
   threading a fastener through the end plate and into the shield; and
   applying a predetermined fastening torque to the fastener to deform at least one deformable rib of the plurality of deformable ribs.

13. The method of claim 12, further comprising:
   fixing the end plate to the end shield so that deformable ribs extending from the protrusion deform.

14. The method of claim 13, wherein the fixing step includes fastening a number of fasteners to the end plate and the shield.

15. The method of claim 12, wherein the placing step includes placing the end plate so that portions of the end plate abut against the shield of the electric motor.

* * * * *